SEMICONDUCTOR LOGIC CIRCUIT WITH VOLTAGE DIVIDING BASE CHANNELS
Filed April 30, 1959 2 Sheets-Sheet 1
Fig. 1.
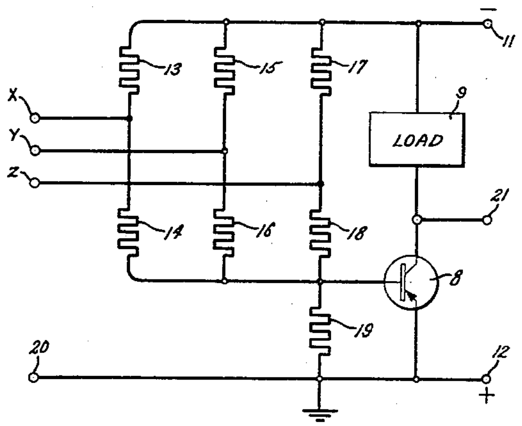
Fig. 2.
| INPUT-X | INPUT-Y | INPUT-Z | OUTPUT-T |
|---|---|---|---|
| O | O | O | + |
| O | O | + | + |
| O | + | O | + |
| O | + | + | + |
| + | O | O | + |
| + | O | + | + |
| + | + | O | + |
| + | + | + | O |
Fig. 3.
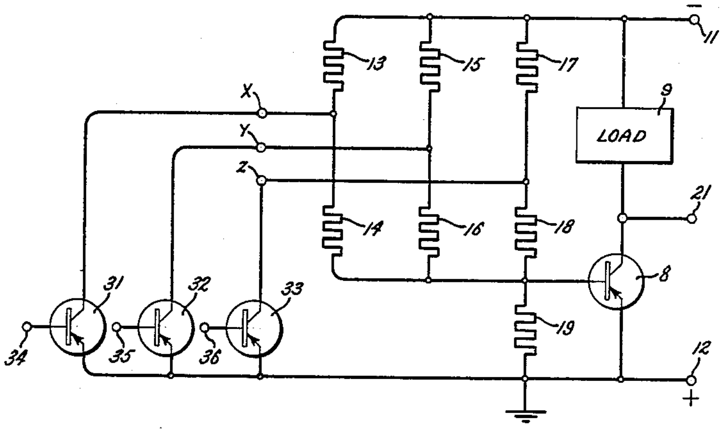
Inventor:
Paul J. de Fries,
by J. Wesley Haubner
His Attorney.

Oct. 6, 1964 P. J. DE FRIES 3,152,263

SEMICONDUCTOR LOGIC CIRCUIT WITH VOLTAGE DIVIDING BASE CHANNELS

Filed April 30, 1959 2 Sheets-Sheet 2

Inventor:
Paul J. de Fries,
by J. Wesley Haubner
His Attorney.

3,152,263

SEMICONDUCTOR LOGIC CIRCUIT WITH VOLTAGE DIVIDING BASE CHANNELS

Paul J. de Fries, Bloomington, Ill., assignor to General Electric Company, a corporation of New York Filed Apr. 30, 1959, Ser. No. 810,116
6 Claims. (Cl. 307—88.5)

This invention relates to electrical control circuits and more particularly to static transistorized circuits for performing logical control functions.

Logic has been defined as the science that deals with the methods of reasoning. Logic function, therefore, when accomplished electrically is simply a means of expressing a predetermined reasoning process with electrical signals. When embodied in a control system these signals function in a decision making capacity.

It has been found that for electrical control purposes reasoning processes can be simulated by means of certain basic logic elements or circuits, often modular in design, interconnected and cascaded in particular combinations and sequences. The logic elements themselves whether functioning on electro-mechanical, magnetic, or electrical principles are often identified by the logical functions performed and it has become common, in the language of symbolic logic, to characterize these elements by terms such as AND, OR, NOT, MEMORY, or DELAY.

An AND element may be defined electrically as one having two or more signal input connections which produces a signal output only when each of the input signals is present. That is, when a predetermined sum of electrical conditions is present an output will be produced by the AND element. A NOT element may be defined as one which produces no output signal when an input signal is present and which produces an output signal when no input signal is present. The NOT element therefore negatives whatever its input signal happens to be.

It is an object of this invention to provide an elemental self-biasing transistorized logic circuit which inherently contains both the AND and NOT logic functions with a small number of circuit components.

It is a further object of this invention to provide a novel elemental logical circuit having a unique truth table permitting the logic functions AND, OR, NOT, and MEMORY to be composed by it.

Still another object of the invention is to provide a modular design for circuits offering the AND, OR, NOT, and MEMORY functions.

By way of a brief summary, a preferred embodiment of this invention employs a single transistor connected in series with a load device across a source of direct currents and having three input circuits associated therewith. These three input circuits are in the form of identical voltage dividers and each is connected in series with a compensating resistor in the base circuit of the transistor. The voltage balance developed by a single direct current source across the voltage dividers and the base resistor is normally such that sufficient self-biasing current flows in the base circuit to render the transistor conducting and, hence, an output signal is normally delivered to the load device. Additional input transistors inserted in each of the three input circuits function to vary the potentials at intermediate points in the voltage dividing base channels, and the circuit impedances are selected such that the biasing current through the base of the first transistor is interrupted only when an input signal is supplied by all three input transistors. As a result the logic circuit provides an output signal to the load device when no input signal is present and when there are some input signals present but not when all input signals are present.

Further details of the present invention as well as additional objects and advantages will be more apparent in connection with the following more detailed description taken in connection with the accompanying drawings wherein:

FIG. 1 is a circuit diagram of a three input logic circuit constructed in accordance with the present invention;

FIG. 2 is a truth table of the circuit shown in FIG. 1; and

FIG. 3 is a modification of the device shown in FIG. 1 employing transistors in the input circuits.

Figure 4:
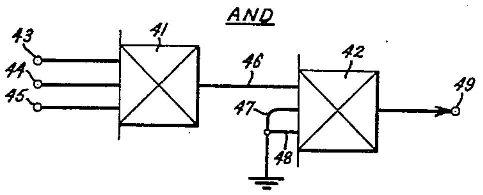
FIG. 4 is a diagrammatic representation of the manner in which two of the basic NAND logic units of FIG. 1 may be combined to provide an AND function.

Turning now to FIG. 1 there may be seen a three input NAND unit, as I prefer to call it, including a PNP transistor 8 having its emitter and collector electrodes connected in series with a source of D.C. potential through load device 9 and terminals 11 and 12. I will show that this circuit provides an output current to the load device when no input signals are present or when input signals are present at less than all of the three input terminals X, Y, and Z but that when all the input terminals are provided with input signals the circuit turns off its output currents to the load device. Between the base of the transistor and the negative side of the D.C. power source are connected three base channels in the form of voltage dividers with resistors 13 and 14 in one base channel, resistors 15 and 16 in another base channel, and resistors 17 and 18 in the last base channel. In the absence of an input signal each one of these three base channels provides a forward bias of the transistor's base electrode permitting the transistor to be driven into saturation by the D.C. power source connected across terminals 11 and 12. To fix the potential at the base electrode and prevent it from floating, a stabilizing resistor 19 is connected from the emitter to the base; this latter resistor functions in a well known manner to render the transistor characteristics less sensitive to temperature variations.

It will be recognized that the voltage dividing base channels establish a potential difference across them which tends to permit current flow from the high potential side represented by terminal 12 into the emitter electrode, out through the base electrode, and through either of the base channels to the low potential side of the power supply represented by terminal 11. An input signal present, for example, at terminal X sufficient to raise the potential at that point above the potential of the base electrode would naturally prevent any base current from flowing in the first channel. However, base currents could still flow in either of the other two channels and these base currents would maintain the transistor in a saturated condition rendering it effectively a closed switch in series with the load 9. The base currents cease only when the potentials at each of the input terminals X, Y, and Z are raised to a level above that of the base. When this condition exists, i.e., when the bias on the base reverses, the transistor instantly desaturates cutting off currents to the load.

I have found it effective in carrying out the present invention to employ a transistor of the type designated commercially 2N321. This transistor has an unsaturated resistance of from one half to one megohm and a saturated resistance of from twenty to fifty ohms. In combination with this transistor a source of about ten volts is sufficient across terminals 11 and 12 with a load impedance of approximately 5K. In the base channels the resistance values I prefer to use are 4.7K for resistors 13, 15, and 17 and 2.2K for resistors 14, 16, and 18. The compensating resistor 19 should have a value of about 500 ohms. No special source of signals is required to place potentials of sufficient magnitude on either of the input terminals X, Y, or Z. For example, switches connecting these inputs to the common terminal 20 would be sufficient, and a signal input condition would correspond to the closing of any one of these switches. The number of voltage-dividing base channels need not be fixed at three, since the circuit can employ two, four or even more connected in the same fashion.

The truth table for the circuit of FIG. 1 is shown in FIG. 2. In this table the plus symbols represent a signal condition, whether input or output, and the zero symbols represent the absence of a signal. An output signal appears across the load between terminals 11 and 21 for all input signal combinations except the last one in the truth table which represents the simultaneous occurrence of signal inputs at all three input terminals. This truth table, it can be seen, is the exact inverse of a truth table for a three input AND unit.

In FIG. 3 is shown a circuit diagram identical to that shown in FIG. 1 but employing additional transistors 31, 32, and 33 for applying input signals to each of the respective input terminals X, Y, and Z of the NAND unit. These input transistors are employed as switches and are intended to operate in the saturation region of their characteristic curves. A signal applied to one of the terminals 34, 35, or 36 sufficient to bias the base of the respective input transistors in a forward direction renders that transistor conductive and drives it immediately into saturation. As a result the potential at the intermediate portion of the associated base channel of transistor 8 is raised to a level which prevents the flow of base currents in that channel. The operation of the circuit is in all other respects the same as in the FIG. 1 example.

The NAND unit described herein lends itself particularly to the modular design of circuits having other logical functions. With one, two, or more NAND units the functions AND, OR, NOT, and MEMORY may be composed, as well as more complex logical sequences employing such basic functions. FIG. 4 shows a three input AND unit employing a pair of NAND units of the type described in FIG. 1. The basic NAND units are illustrated symbolically at 41 and 42, the convention adopted representing a standard block type designation of an AND unit with an X therein to indicate the inversion of function in the unit. In this and the following three examples the input channels of each unit are representd on the left-hand side of the individual NAND units and the single output channel appears on the right-hand side.

Recalling the truth table of FIG. 2 in connection with the illustration in FIG. 4, it can be seen that most input signal combinations at the input terminals 43, 44, and 45 produce an output signal which is applied to the input channel 46 of the second NAND unit. Since the other two input channels 47 and 48 of NAND unit 42 are grounded (equivalent to a signal input) any input to channel 46 will turn off the final output so that no signal is produced at terminal 49. Unit 41 produces no output signal only when input signals are present at all three of the terminals 43, 44, and 45. But the lack of an output from unit 41 is the very condition which causes unit 42 to produce an output signal. Hence, the combination as a whole produces an output signal only when input signals are present in all three channels 43 and 44, and 45. This, by definition, classifies the circuit of FIG. 4 as a three input AND unit although more input channels could be added, or by grounding one of the terminals 43, 44, or 45 the circuit would function as a two input AND unit.

Figure 5:
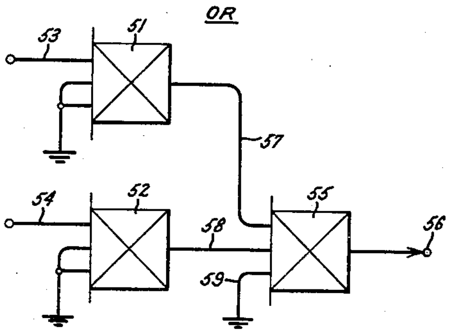
FIG. 5 shows diagrammatically a group of logic units of the type shown in FIG. 1 connected to provide the OR function.

FIG. 5 shows three NAND units grouped to form a circuit having the OR function. An OR circuit should produce an output signal when input signals are present in either one or another of its input channels. Each of the units 51 and 52 has two of its individual input channels grounded representing, for purposes of the truth table in FIG. 2, an input signal condition to these channels of the two NAND units. The other two input channels 53 and 54 represent the inputs to the OR unit which, in this case, is the larger combination. The NAND unit 55 will produce an output signal at terminal 56 only when there is an absence of a signal on at least one of its input channels 57 and 58, the other channel 59 being grounded. Consequently a signal input to either channel 53 or 54 will cause the output of the associated NAND unit to be interrupted, thereby causing the very condition which will result in the production of an output signal by unit 55.

Figure 6:
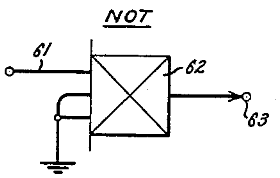
FIG. 6 represents how the NOT function may be obtained with a single circuit of the type shown in FIG. 1.

The very elementary NOT function is achieved by the use of a single NAND unit as shown in FIG. 6 with two of its input channels grounded. Since grounding of an input channel is equivalent to a signal input, any signal applied to the remaining channel 61 will cause the NAND unit 62 to produce no output signal at terminal 63. Conversely the absence of an input signal on channel 61 will result in the presence of an output signal at 63. This, of course, is the nature of a NOT unit.

Figure 7:
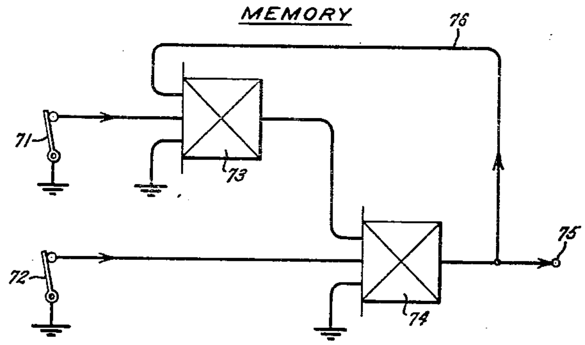
FIG. 7 represents a MEMORY circuit employing only circuits of the type shown in FIG. 1.

A MEMORY unit, as the name implies, is one which "remembers" which of two input signal conditions last existed. In the circuit of FIG. 7 these two input signal conditions correspond to the momentary opening of one of the two switches 71 or 72. For the purposes of analysis of the operation of this circuit it can be assumed that initially with both switches 71 and 72 closed there is no output from unit 73 and hence, a positive output from unit 74 which appears at terminal 75. If the switch 71 is momentarily opened unit 73 begins then to supply an output signal which completes the sum of positive input signals required to turn off the output of unit 74. Immediately that the output from unit 74 ceases, feedback connection 76 signals this condition to one of the input channels of unit 73. As a result of the interruption of the input signal in this channel unit 73 continues to produce an output signal even after the reclosure of switch 71 and the circuit as a whole produces no output at 75.

Momentary opening of switch 72, by interrupting an input signal channel of unit 74 will cause this unit again to produce an output signal. Feedback connection 76 then applies a portion of this output signal to one input channel of unit 73 causing this unit to turn off its output. Since interruption of the output of unit 73 causes one of the input signals to be removed from an input channel of unit 74, the latter unit remains in an ON condition even after the switch 72 is reclosed.

If it should be desired that the circuit of FIG. 7 respond to a momentary closure of the associated contacts instead of to the momentary opening of these contacts a simple NOT unit such as that shown in FIG. 6 could be interposed between the switches and the respective NAND units 73 and 74.

From the foregoing it can be seen that the NAND unit described is quite versatile in its application since it is modular to the construction of many other logical functions. Furthermore, it is unusually simple in its circuit configuration and, hence, lends itself well to the construction of large and complex decision making equipment.

Since certain variations within the scope of the present invention will doubtless occur to those skilled in the art to which this invention pertains I wish it to be understood that the examples set forth herein are illustrative in nature and that the appended claims are intended to apply to all such variations as fall within the true spirit and scope of this invention.

What I claim as new and desire to secure by Letters Patent of the United States is:

1. A logic circuit comprising: a semiconductor device having collector, emitter and base electrodes; means for supplying a undirectional operating potential across said emitter and collector electrodes; means for providing bias potentials on the base electrode of said semiconductor device derived solely from said operating potential supplying means including an impedance connected across said emitter and base electrodes, and a plurality of similar voltage dividing circuit branches connected in parallel with each other from said base electrode to the collector side of the potential-supplying means to provide self-biasing base currents in said semiconductor device; and means for selectively shorting a portion of each voltage dividing circuit to the emitter side of said potential supplying means, the impedance values of said voltage dividing circuit branches being selected to provide sufficient base current to render said semiconductor device conductive except when a portion of each voltage dividing circuit is shorted by said selective shorting means.

2. A logic circuit comprising: a gate semiconductor device having collector, emitter, and base electrodes; means for supplying an operating potential across said emitter and collector electrodes; means for providing bias potentials on the base electrode of said semiconductor device derived solely from said operating potential supplying means including a plurality of voltage dividing base channels connected in parallel with each other from said base electrode to the collector side of the potential supplying means and in series with said base electrode, each of said base channels drawing sufficient current from said operating potential supplying means through said base electrode to bias it in a forward direction thereby driving said semiconductor devices into saturation to deliver operating currents to a load device; and means for selectively preventing base currents from flowing in any selected one of said base channels.

3. The circuit of claim 2 wherein said last mentioned means comprises: a plurality of input semiconductor devices each of which is connected between the emitter electrode side of said gate semiconductor device and an intermediate portion of one of said base channels, and means including a base electrode on each of said input semiconductor devices for varying the conductivity thereof.

4. A logic circuit comprising: a semiconductor device having collector, emitter and base electrodes; means for supplying an operating potential across said emitter and collector electrodes; means for providing bias potentials on the base electrode of said semiconductor device derived solely from said operating potential supplying means including a biasing impedance connected between said base electrode and the emitter side of said potential supplying means, and a plurality of similar voltage dividing circuit branches connected in parallel with each other from said base electrode to the collector side of the potential supplying means to provide a self-biasing base current in said semiconductor device; means for selectively shorting a portion of each voltage dividing circuit to the emitter side of said potential supplying means, the impedance values of said biasing impedance and said voltage dividing circuit branches being selected to provide sufficient base current to render said semiconductor device conductive except when a portion of each voltage dividing circuit is shorted by said selective shorting means.

5. A logic circuit comprising: supply conductors for connection to a direct current source; a load device; a semiconductor device having collector, emitter and base electrodes; means connecting said semiconductor device and said load device in series across said supply conductor; means for providing bias potentials on the base electrode of said semiconductor device derived solely from said supply conductors including a plurality of similar voltage dividing base channels connected in parallel circuit relation and each comprising a pair of impedance elements connected in series between said base electrode and the supply conductor on the collector side of said semiconductor device to provide self biasing base currents in said semiconductor device, said base channels each drawing sufficient forward currents through the base electrode of said semiconductor device to drive said semiconductor device into saturation; and means for selectively altering the potential at a point in each of said base channels between said pair of impedance elements to interrupt the flow of base currents in any selected one of said base channels.

6. A logic circuit comprising: a semiconductor device having collector, emitter, and base electrodes; means for supplying an operating potential across said emitter and collector electrodes; means for providing bias potentials on the base electrode of said semiconductor device derived solely from said operating potential supplying means including a plurality of similar voltage dividing base channels connected in parallel with each other from said base electrode to the collector side of the potential supplying means, each of said base channels comprising a pair of impedance elements and drawing sufficient current from said operating potential supplying means through said base electrode to bias it in a forward direction thereby driving said semiconductor device into saturation; and means for selectively altering the potential at a point in each of said base channels intermediate the pair of impedance elements to interrupt the flow of base currents in any selected one of said base channels.

References Cited in the file of this patent

UNITED STATES PATENTS

| | | |
|---|---|---|
| 2,622,212 | Anderson | Dec. 16, 1952 |
| 2,892,099 | Gray | June 23, 1959 |
| 2,901,640 | Steinman | Aug. 25, 1959 |
| 2,962,604 | Brittain | Nov. 29, 1960 |

FOREIGN PATENTS

| | | |
|---|---|---|
| 2,962,604 | Great Britain | Nov. 29, 1960 |

OTHER REFERENCES

"Transistor Nor Circuit Design," by Robert D. Rowe, published December 18, 1956, A.I.E.E. Transactions Paper No. 57–196, eleven (11) pages.

Pressman, A. I.: "Design of Transistorized Circuits for Digital Computers," John F. Rider Co., New York, N.Y. 1959 (Chapt. 8).

Beaulieu, D. E. Burkhart, D. P., and Propster, Eh.: "The Bizmac Transcoder," part IV, pages 294–299, I.R.E. Wescon Convention Record, 1957.